(12) United States Patent
Van Haver et al.

(10) Patent No.: US 11,782,124 B2
(45) Date of Patent: Oct. 10, 2023

(54) ELECTRIC OR ELECTRONIC DEVICE MODULE COMPRISING AT LEAST ONE RADAR SENSOR

(71) Applicant: NIKO NV, Sint-Niklaas (BE)

(72) Inventors: Karel Van Haver, Singapore (SG); Diederik Devenyn, Merelbeke (BE)

(73) Assignee: NIKO NV, Sint-Niklaas (BE)

( * ) Notice: Subject to any disclaimer, the term of this patent is extended or adjusted under 35 U.S.C. 154(b) by 29 days.

(21) Appl. No.: 16/968,069

(22) PCT Filed: Feb. 11, 2019

(86) PCT No.: PCT/EP2019/053317
§ 371 (c)(1),
(2) Date: Aug. 6, 2020

(87) PCT Pub. No.: WO2019/155062
PCT Pub. Date: Aug. 15, 2019

(65) Prior Publication Data
US 2021/0055378 A1 Feb. 25, 2021

(30) Foreign Application Priority Data
Feb. 12, 2018 (BE) .................................. 2018/5081

(51) Int. Cl.
*G01S 7/40* (2006.01)
*G01S 13/08* (2006.01)
(Continued)

(52) U.S. Cl.
CPC ................ *G01S 7/40* (2013.01); *G01S 13/08* (2013.01); *G01S 13/72* (2013.01); *G01S 13/89* (2013.01)

(58) Field of Classification Search
CPC .... G01S 13/931; G01S 13/4463; G01S 13/72; G01S 13/56; G01S 13/08; G01S 2013/0245
(Continued)

(56) References Cited

U.S. PATENT DOCUMENTS 3,307,181 A * 2/1967 Winfield ................. G01S 13/72
342/96
4,011,563 A * 3/1977 Robbi ..................... G01S 7/352
342/128

(Continued)

OTHER PUBLICATIONS

Budge Jr., "EE 619—Intro to Radar Systems—1.0 Radar Basics ", Aug. 15, 2011, Retrieved from the Internet: URL: http://www.ece.uah.edu/courses/material/EE619-2011/RadarBasics(1)2011.pdf, pp. 1-12.

(Continued)

*Primary Examiner* — Timothy A Brainard
*Assistant Examiner* — Michael W Justice
(74) *Attorney, Agent, or Firm* — WORKMAN NYDEGGER

(57) ABSTRACT

An electric or electronic device module comprises an electronic device, means for powering the electric or electronic device module, and at least one radar sensor having a detection range. The electric or electronic device module has a processor adapted for calibrating the at least one radar sensor by at least partly automatically defining and calculating parameters of boundaries of a predefined geometry, in which the at least one radar sensor has to measure, in order to prevent the at least one radar sensor from taking into account measurements outside that predefined geometry. The predefined geometry is located within the detection range of the at least one radar sensor and is equally sized to or smaller than that detection range of the at least one radar sensor.

16 Claims, 10 Drawing Sheets

(51) Int. Cl.
  *G01S 13/72* (2006.01)
  *G01S 13/89* (2006.01)
(58) Field of Classification Search
  USPC .......................................... 342/173, 174, 70
  See application file for complete search history.

(56) References Cited

U.S. PATENT DOCUMENTS

| | | | | |
|---|---|---|---|---|
| 5,374,932 A * | 12/1994 | Wyschogrod | | G01S 13/91 |
| | | | | 342/39 |
| 5,424,742 A * | 6/1995 | Long | | G01S 13/904 |
| | | | | 342/25 C |
| 5,430,445 A * | 7/1995 | Peregrim | | G01S 13/22 |
| | | | | 342/25 C |
| 5,519,618 A * | 5/1996 | Kastner | | G08G 5/065 |
| | | | | 701/120 |
| 6,069,561 A | 5/2000 | Schöpf et al. | | |
| 6,577,269 B2 * | 6/2003 | Woodington | | G01S 13/865 |
| | | | | 342/72 |
| 7,463,182 B1 * | 12/2008 | Morinaga | | G01S 13/931 |
| | | | | 342/107 |
| 7,492,306 B2 * | 2/2009 | Humphrey | | G01S 13/04 |
| | | | | 340/552 |
| 7,855,675 B2 * | 12/2010 | Fouet | | G08G 5/0021 |
| | | | | 342/36 |
| 8,077,081 B2 * | 12/2011 | Bateman | | G01S 7/06 |
| | | | | 342/190 |
| 8,314,732 B2 * | 11/2012 | Oswald | | G01S 7/2926 |
| | | | | 342/195 |
| 8,362,946 B2 * | 1/2013 | Bishop | | G01S 13/867 |
| | | | | 342/179 |
| 8,630,805 B2 * | 1/2014 | Becker | | G01S 13/89 |
| | | | | 342/357.73 |
| 9,395,436 B2 * | 7/2016 | Katuri | | G01S 13/87 |
| 9,769,374 B2 * | 9/2017 | Moeller | | G06V 20/00 |
| 9,898,821 B2 * | 2/2018 | Metzler | | G06T 7/75 |
| 10,101,448 B2 * | 10/2018 | Hamada | | G01S 13/867 |
| 10,613,213 B2 * | 4/2020 | Silverstein | | G01S 13/867 |
| 10,634,778 B2 * | 4/2020 | Liu | | G01S 13/66 |
| 10,733,861 B2 * | 8/2020 | Russo | | G07C 9/00571 |
| 10,928,498 B1 * | 2/2021 | Li | | H04W 64/00 |
| 11,275,178 B2 * | 3/2022 | Yang | | G06F 18/22 |
| 2002/0044082 A1 * | 4/2002 | Woodington | | H01Q 13/10 |
| | | | | 342/128 |
| 2004/0217899 A1 * | 11/2004 | Kikuchi | | G01S 13/931 |
| | | | | 342/75 |
| 2007/0222663 A1 * | 9/2007 | Humphrey | | G01S 13/42 |
| | | | | 340/552 |
| 2008/0266169 A1 * | 10/2008 | Akita | | B60W 40/04 |
| | | | | 342/117 |
| 2009/0212992 A1 * | 8/2009 | Fouet | | G08G 5/045 |
| | | | | 342/37 |
| 2009/0219189 A1 * | 9/2009 | Bateman | | G01S 7/06 |
| | | | | 342/30 |
| 2010/0076599 A1 * | 3/2010 | Jacobs | | G05D 1/028 |
| | | | | 901/1 |
| 2010/0109938 A1 * | 5/2010 | Oswald | | G01S 13/522 |
| | | | | 707/E17.014 |
| 2011/0199254 A1 * | 8/2011 | Bishop | | G01S 13/867 |
| | | | | 342/179 |
| 2012/0314081 A1 * | 12/2012 | Kleihorst | | G08B 13/19608 |
| | | | | 348/E7.085 |
| 2013/0103301 A1 * | 4/2013 | Becker | | G01S 13/89 |
| | | | | 342/52 |
| 2013/0127656 A1 * | 5/2013 | Webster | | G01S 13/91 |
| | | | | 342/159 |
| 2014/0361920 A1 * | 12/2014 | Katuri | | G01S 13/04 |
| | | | | 342/28 |
| 2015/0203109 A1 * | 7/2015 | McClain | | B60T 8/17557 |
| | | | | 701/1 |
| 2016/0109566 A1 * | 4/2016 | Liu | | G01S 13/867 |
| | | | | 342/52 |
| 2016/0170020 A1 * | 6/2016 | Hamada | | G01S 13/723 |
| | | | | 342/70 |
| 2016/0253808 A1 * | 9/2016 | Metzler | | G06T 17/05 |
| | | | | 382/103 |
| 2017/0195544 A1 * | 7/2017 | Moeller | | H05B 47/115 |
| 2017/0328994 A1 * | 11/2017 | Abe | | H01Q 1/3233 |
| 2017/0328997 A1 * | 11/2017 | Silverstein | | G01S 13/765 |
| 2017/0329449 A1 | 11/2017 | Silverstein et al. | | |
| 2018/0143321 A1 * | 5/2018 | Skowronek | | G01S 17/66 |
| 2018/0144594 A1 * | 5/2018 | Russo | | G08B 13/24 |
| 2019/0072659 A1 * | 3/2019 | Gu | | G01S 13/42 |
| 2019/0250262 A1 * | 8/2019 | Karthick Nagaraj | ... | G01S 13/52 |
| 2020/0209377 A1 * | 7/2020 | Ogura | | G01S 13/04 |
| 2020/0379115 A1 * | 12/2020 | Yang | | G01S 7/4808 |
| 2020/0393541 A1 * | 12/2020 | Schmid | | G01S 7/414 |

OTHER PUBLICATIONS

International Search Report and Written Opinion from PCT Application No. PCT/EP2019/053317, dated Apr. 4, 2019.
Search report from corresponding BE Application No. 201805081, dated Nov. 9, 2018.

* cited by examiner

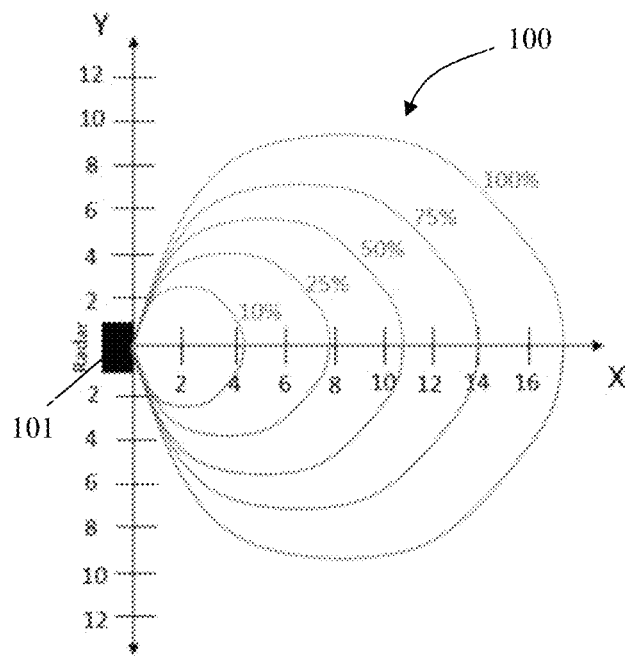
FIG. 1A – PRIOR ART
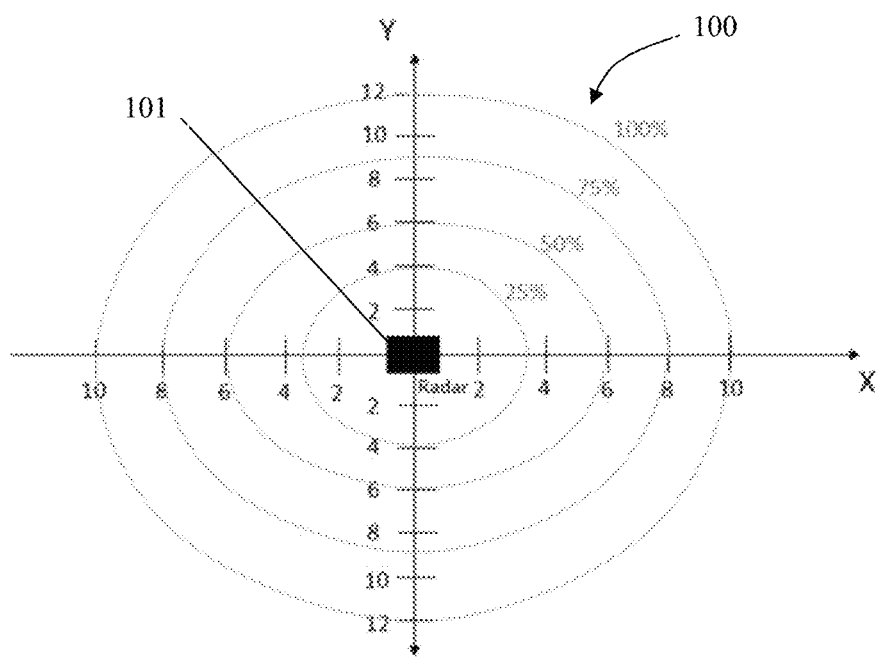
FIG. 1B – PRIOR ART

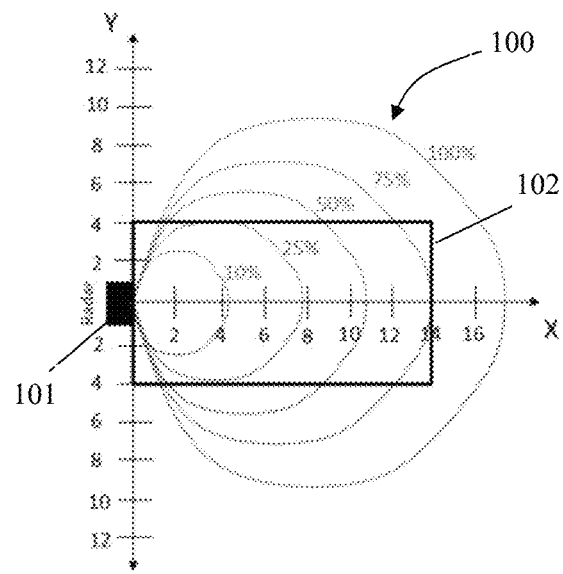
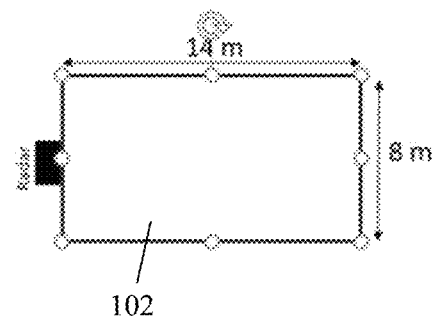
FIG. 2A – PRIOR ART
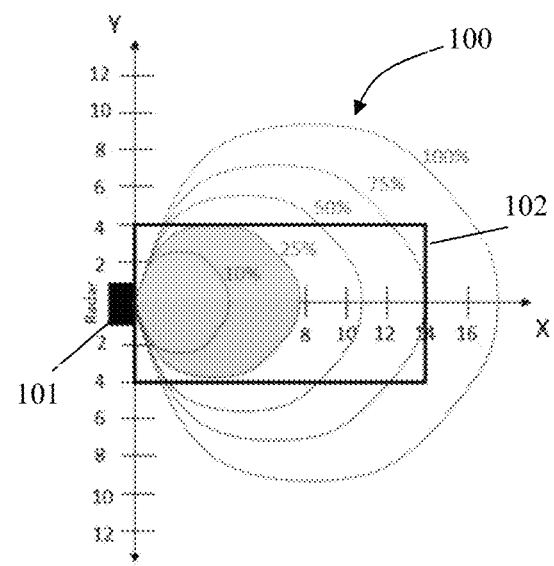
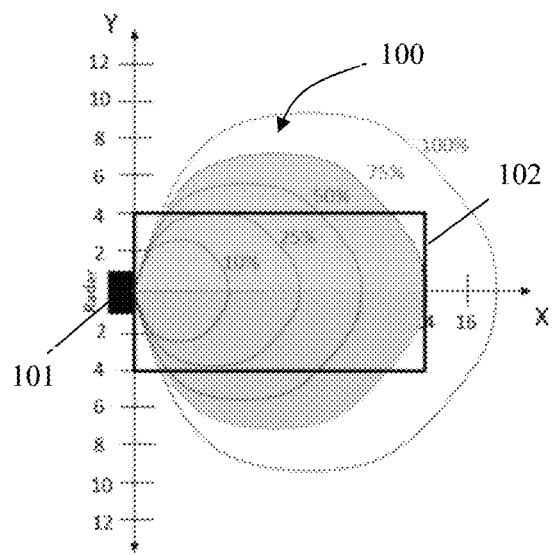
FIG. 2B     FIG. 2C
PRIOR ART

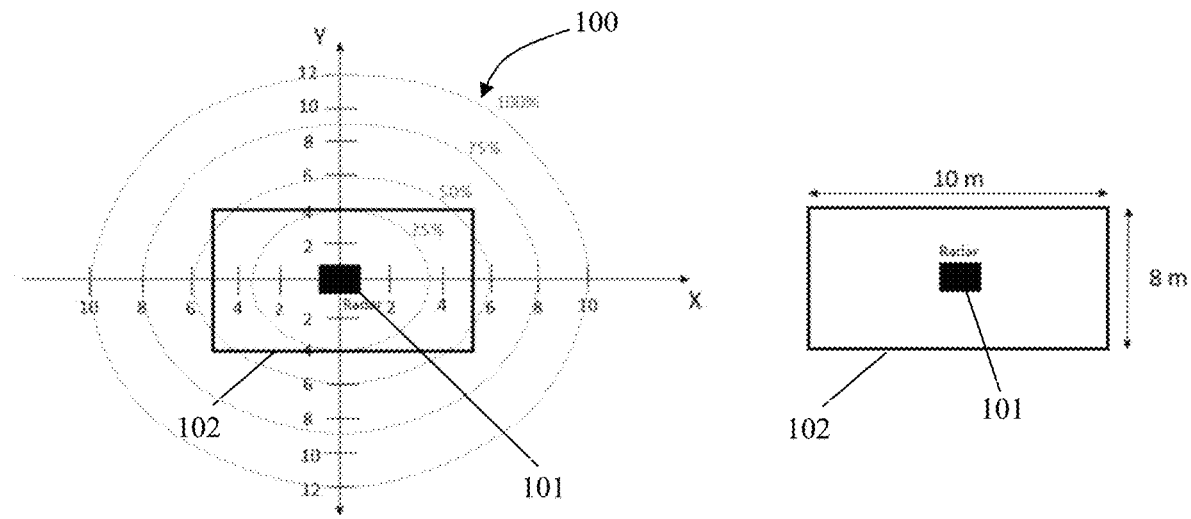
FIG. 3A – PRIOR ART
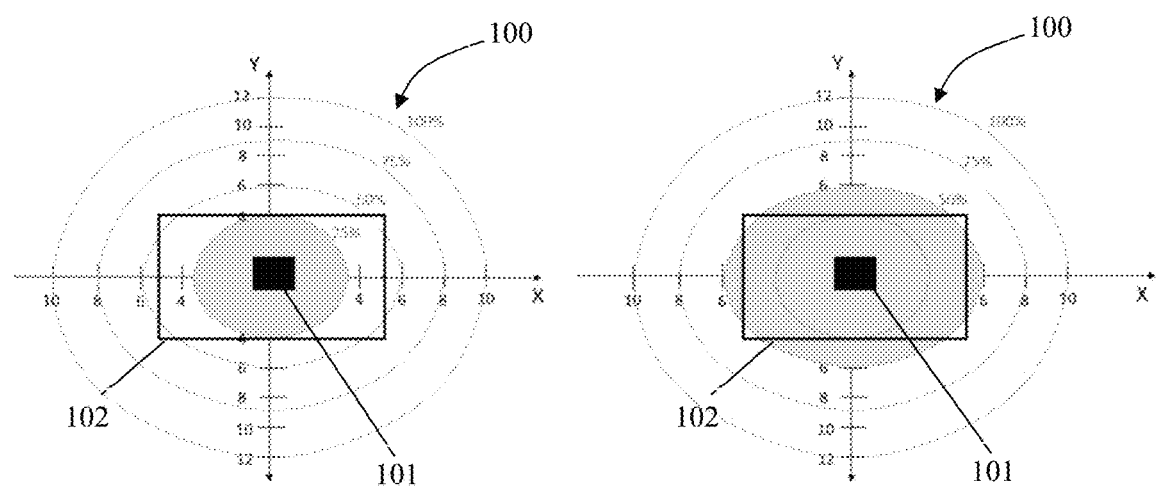
FIG. 3B     FIG. 3C
PRIOR ART

ELECTRIC OR ELECTRONIC DEVICE MODULE COMPRISING AT LEAST ONE RADAR SENSOR

TECHNICAL FIELD OF THE INVENTION

The present invention relates to electric or electronic device modules, such as for example a light switch module, a lighting device module, a display module, a sensor module or the like. In particular, the invention relates to an electric or electronic device module comprising at least one radar sensor. The present invention further relates to a method for calibrating the at least one radar sensor that is part of such an electric or electronic device module by defining and setting a predefined geometry or area of interest for the at least one radar sensor.

BACKGROUND OF THE INVENTION

A radar sensor system is an object-detection system that uses radio waves to determine the range, angle, or velocity of objects. A radar system may comprise a transmitter for providing electromagnetic waves in the radio or microwaves domain, a transmitting antenna, a receiving antenna and a receiver and processor to determine properties of the object (s). Transmitting antenna and receiving antenna may be the same antenna. The use of radar technology is well known for a variety of applications. One of such radar technology applications is in home automation for e.g. security or intrusion detection systems, presence or motion detection, . . . .

A problem that arises when using radar sensors which are located in, for examples, rooms of a building, is that the radio waves of such radar sensors can penetrate through building materials. Rooms may normally have windows and doors, and also the walls can be made out of different materials, through which radio waves of the radar sensors can penetrate. Therefore, before such radar system can properly function, it has to be calibrated in order to reduce false detections originating from movements outside the room but within the detection range of the radar sensor.

In order to set the area in which the radar sensor has to measure, the radar sensor needs calibration before it is used. Today, radar sensors are calibrated by means of a potentiometer, a dip switch, or the like, which is integrated in the radar sensor. This means that the range in which the radar sensors need to measure, also referred to as the detection range, can be set and/or adapted by turning the potentiometer. FIG. 1A illustrates a detection pattern 100 for a wall mounted radar sensor 101. FIG. 1B illustrates the detection pattern 100 for a ceiling mounted radar sensor 101. In both FIG. 1A and FIG. 1B, the detection range is shown in percentage (%) of the maximum detection range (=100%). When turning the potentiometer or dip switch integrated in the radar sensor 101, the detection pattern 100 will always be adjusted in both X and Y direction in a same way. It is thus not possible to only adjust the detection pattern 100 in the X direction, or only in the Y direction. Because of that, the degree of coverage of a room 102 is limited by the detection range that can be set. Therefore, depending on the shape and size of the room 102 it will be difficult to always cover the whole room or even to cover a predefined area in which the radar sensor has to measure. This is illustrated in FIGS. 2A-2C and FIGS. 3A-3C. FIGS. 2A and 3A illustrate a radar sensor detection pattern 100 in a rectangular shaped room 102 respectively for a wall mounted radar sensor 101 and for a ceiling mounted radar sensor 101. In the examples given the room has a length of 14 m and a width of 8 m. According to FIGS. 2A-2C a radar sensor 101 is located on one of the walls of the room 102, while, according to FIGS. 3A-3C, the radar sensor 101 is located on a ceiling of the room 102. As illustrated in FIGS. 2B and 2C and 3B and 3C, with the standard state-of-art technology, it is only possible to adjust the detection pattern in % of the maximum detection range. Knowing that radar signals penetrate through building materials (bricks, wood, etc), it is not possible to adjust the radar detection pattern in such a way it covers the complete room 102, while not giving false detections because of movements and/or presence outside that room. To avoid false detections from movements and presence outside the room, the radar sensor detection pattern (grey area) could be reduced to 25% as illustrated in the drawings. However, by doing so, a part of the room 102 can no longer be covered by the radar sensor detection pattern (grey area). To achieve almost a full detection coverage in the room 102, the radar sensor detection pattern 100 can be set to 75% (FIGS. 2B and 2C) or to 50% (FIGS. 3B and 3C (grey area). But it can be seen in the drawing, that because the radar signals penetrate through building materials, there will also be detection outside the room (grey area is also outside the room). These detections give false triggers when for example the radar 101 is used as a motion detector device to control for example a lighting device inside the room, i.e. the lighting device being turned on when movement in the room is detected. Hence, with prior art radar sensors a choice or compromise has always to be made between an as complete room coverage as possible with a higher chance of false detection and an as low as possible false detection with less coverage of the room.

SUMMARY OF THE INVENTION

It is an object of embodiments of the present invention to provide an electric or electronic device, such as e.g. a light switch module, a display module, a sensor module or the like, comprising at least one radar sensor and to provide a method for calibrating the at least one radar sensor in the electric or electronic device module by defining a predefined geometry or area in which the at least one radar sensor has to measure.

The above objective is accomplished by a device and a method according to embodiments of the present invention.

In a first aspect, the present invention provides an electric or electronic device module, also referred to as electric or electronic installation material. The electric or electronic device module comprises an electric or electronic device, such as e.g. a light switch, a sensor, a socket, a USB device, a lighting device, a thermostat, a video door station, a display, such as e.g. a touch screen provided on an internal wall of a building, a detector such as e.g. a motion detector, a presence detector, an absence detector, . . . , a speaker device, a wireless router, or the like, and means for powering the electric or electronic device module. The electric or electronic device furthermore comprises at least one radar sensor having a particular detection range, as defined during the manufacturing of the radar sensor. Further according to the present invention, the electric or electronic device module comprises a processor adapted for calibrating the at least one radar sensor by at least partly automatically defining and calculating parameters of boundaries of a predefined geometry, also referred to as predefined volume, or predefined shape, or predefined space, or area of interest, or predefined detection volume, or predefined spatial volume of the radar sensor, in which the at least one radar sensor has to measure, in order to prevent the at least one radar sensor from taking into account measurements outside that predefined geometry or area. The predefined geometry or area is located within the detection range of the at least one radar sensor and is equally sized to or smaller than the detection range of the at least one radar sensor.

According to the present invention, a distinction is made between two characteristic ranges or areas of the at least one radar sensor. A first range is, according to this invention, referred to as the detection range of the at least one radar sensor. This means the range that the at least one sensor can cover, independent of calibration or other settings of this sensor. This detection range may be larger than, for example, a room in which the at least one radar sensor is positioned or larger than the intended area for detection for a particular application. The second range or area which is talked about in this invention, is the predefined geometry or area of interest of the at least one radar sensor. With this term is meant the real range or area in which the at last one radar sensor has to measure for a particular application. An important characteristic of this invention, is that this predefined geometry or area of interest can exactly be set, which is not the case with prior art radar sensors. A first advantage hereof is that this overcomes the problem of false detection by also detecting movements outside the predefined geometry or area of interest, such as e.g. a room, because, as was already mentioned above, it is known that radar waves are able to penetrate certain building materials. A further advantage is that any shape of predefined geometry or area of interest can be defined in which the at least one radar sensor needs to measure.

With at least partly automatically is meant that at least part of defining and calculating parameters of the boundaries of the predefined geometry in which the at least one radar sensor has to measure is done by the processor itself without or with only little or limited interference of a user. According to embodiments of the invention such boundaries can be "real" boundaries, such as for example walls of a room, or can be "imaginary" boundaries determined by a user. With imaginary boundaries is meant that the boundaries do not coincide with physical items, but are just fictitious boundaries predefined by a user and defining a space or area of interest in which the radar sensor has to measure.

A further advantage of embodiments of the invention is that for the at least one radar sensor in the electric and electronic device module, defining and calculating parameters of the boundaries of the predefined geometry or area in which the at least one radar sensor has to measure can be done easy and fast, and more precise with respect currently existing radar sensors, in which setting the such predefined geometry or area is limited by the detection range that can be set by the potentiometer of the radar sensor.

Still a further advantage of embodiments of the invention is that, although the detection range of the at least one radar sensor can still be outside the predefined geometry in which the at least one radar sensor has to measure or detect, because of the calibration according to embodiments of the invention, the at least one radar sensor will know that it has not to take into account measurements or detections from outside this predefined geometry or area of interest, which significantly decreases the false measurement and thus will significantly increase the liability of the at least one radar sensor in the electric or electronic device module.

The electric or electronic device module may furthermore comprise means for storing the parameters of the boundaries of the predefined geometry. The storing means may, according to embodiments of the invention, be a memory that is part of the electric or electronic device module, or may, according to other embodiments, be external to the electric or electronic device module, and may e.g. be a storing location in the cloud or in a remote control and communication means, such as a gateway.

According to embodiments of the invention, the at least one radar sensor may be adapted for setting up a range-angle map of the predefined geometry by scanning in at least one of the azimuth plane and the elevation plane, and the processor may be adapted to, from het range-angle map, automatically determine the parameters of the predefined geometry in which the at least one radar sensor has to measure.

An advantage of an electric or electronic module according to the present embodiment is that the parameters of the boundaries of the predefined geometry in which the at least one radar sensor has to measure are detected fully automatically. This saves a lot of time for a user, as the user only has to trigger the start of defining and calculating the parameters of the boundaries of the predefined geometry or area of interest of the at least one radar sensor by, for example, pushing a button on the electric or electronic device module, and does not have to do anything further to get the parameters of the boundaries of the predefined geometry defined and calculated. According to further embodiments of the invention, triggering the start of defining and calculating the parameters of the boundaries of the predefined geometry can also be set to be default when starting up the electric or electronic device module. This means that, when the electric or electronic device module is put on or powered, defining and calculating the parameters of the boundaries of the predefined geometry will start automatically.

According to further embodiments of the invention, the at least one radar sensor may be adapted for detecting aiding elements, e.g. (external) attributes or (external) reflectors for reflecting the radar signal, present at the boundaries of the predefined geometry in which the at least one radar sensor has to measure and the processor may be adapted to, from the location of the aiding elements, automatically determine the parameters of the boundaries of the predefined geometry in which the at least one radar sensor has to measure.

According to this embodiment, defining and determining the parameters of the boundaries of the predefined geometry in which the at least one radar sensor has to measure may be semi-automatically or partly automatically, because interference of a user may be required for positioning the aiding elements. Examples of such aiding elements can, for example, be metal plates, other radar sensors, a person, For example, the aiding element may a panel made from any known material that is opaque or partially opaque for radar sensor signals, or in other words, that has an observable reflection at normal incidence of the radar signal, such as e.g. a metal plate, an OSB plate, a wood panel, an MDF panel, a glass panel or the like.

With respect to prior art device modules, an electric or electronic device module according to such embodiments of the invention still has the advantage of being faster and easier for a user. Further, because of using the aiding elements any shape of predefined geometry or area of interest can be determined in which the at least one radar sensor has to measure. This method can be performed solely or can be combined with any of the other methods as described in this invention. When using a combination of more than one method, the boundaries of the predefined geometry or area of interest in which the at least one radar sensor has to measure will be determined more precisely.

According to still further embodiments, the at least one radar sensor may be adapted for tracking a path of at least one moving target, e.g. person walking around, in and/or around the predefined geometry in which the at least one radar sensor has to measure and the processor may be adapted to, from the tracked path, automatically determine the boundaries of the predefined geometry.

Also according to this embodiment, calibration is done semi-automatically or partly automatically, as also here interference of a user may be required. This method can be performed solely or can be combined with any of the other methods as described. When using a combination of more than one method, the boundaries of the predefined geometry or area of interest in which the at least one radar sensor has to measure will be determined more precisely.

According to still further embodiments, the electric or electronic device module may furthermore comprise means for assisting in defining and calculating the boundaries of the predefined geometry in which the at least one radar sensor has to measure and the processor may be adapted to, from the measurement results of the assisting means and optionally in combination with results from other methods described above, automatically determine the boundaries of the predefined geometry.

The means for assisting in defining and calculating the parameters of the boundaries of the predefined geometry or area of interest of the at least one radar sensor may be means suitable for using time-of-flight measurement or triangular techniques. The means for assisting in defining and calculating the parameters of the boundaries of the predefined geometry or area of interest of the at least one radar sensor may, for example, be a laser, an image sensor, a PIR sensor, a LIDAR detector or the like.

According to this embodiment, defining and calculating the parameters of the boundaries of the predefined geometry or area of interest of the at least one radar sensor may, dependent on the technique used, be fully or partly automatic. This method can be performed solely or can be combined with any of the other methods as described. When using a combination of more than one method, the boundaries of the predefined geometry in which the at least one radar sensor has to measure will be determined more precisely.

The processor may be adapted for regularly repeating defining and calculating the parameters of the boundaries of the predefined geometry or area of interest of the at least one radar sensor for refining the determination of the boundaries of the predefined geometry in which the at least one sensor has to measure. This may also be referred to as self-learning.

According to embodiments of the invention, the electric or electronic device module may furthermore comprise means for triggering the start of defining and calculating the parameters of the boundaries of the predefined geometry or area of interest of the at least one radar sensor. The means for triggering the start of defining and calculating the parameters of the boundaries of the predefined geometry of the at least one radar sensor may, according to embodiments of the invention, be means for automatically start defining and calculating the parameters of the boundaries of the predefined geometry of the at least one radar sensor when the electric or electronic device module is put on. According to other embodiments, the means for triggering the start of defining and calculating the parameters of the boundaries of the predefined geometry of the at least one radar sensor may be an app on a smart phone or a tablet or a button on the electric or electronic device module.

The means for powering the electric or electronic device module may comprise a connection to an AC or DC grid or to an energy harvesting system such as, for example, solar cells.

The electric or electronic device module may be adapted for being provided on or in an internal or external wall of a building, in or on a ceiling of a building or on a pillar that is located inside or outside a building. With internal wall of a building is meant a side of the wall that is located on the inside of the building. With an external wall of the building is meant a side of the wall that is located at the outside of the building. According to embodiments of the invention, the electric or electronic device module may be provided at any location on a ceiling, preferably in the middle of the ceiling or in a corner, or at any location on a wall.

According to embodiments of the invention, the at least one radar sensor may be any suitable radar sensor known by a person skilled in the art and may preferably be a pulse-Doppler or Frequency Modulated Continuous Wave radar with either a MIMO (multiple input multiple output) or a SISO (single input single output) antenna topology.

According to embodiments of the invention, the electric or electronic device module may be a stand-alone device module. In other words, according to these embodiments, the electric or electronic device module is not part of a bigger home automation system, but is intended to work independently.

According to other embodiments, the electric or electronic device module may be configured to be part of an automation system for residential buildings, offices, schools or hospitals.

The electric or electronic device module may furthermore comprise a communication module. According to embodiments of the invention, this communication means may be for communicating with an external electric or electronic device. For example, when the electric or electronic device module is a stand-alone light switch module, the communicating means may be means for controlling a lighting device. According to other embodiments of the invention, where the electric or electronic device module is part of an automation system, the communication means may be for controlling and/or communicating with other electric or electronic devices in the automation system.

In a second aspect, the present invention provides a method for calibrating at least one radar sensor in an electric or electronic device module according to embodiments of the invention, in order to prevent the at least one radar sensor from taking into account measurements outside the predefined geometry. Calibrating the at least one radar sensor comprises defining and setting a predefined geometry for the at least one radar sensor. The method comprises, by means of the processor, at least partly automatically defining and calculating parameters of a predefined geometry or area of interest in which the at least one radar sensor has to measure, the predefined geometry or area of interest being located within the detection range of the at least one radar sensor and being equally sized to or smaller than the detection range of the at least one radar sensor.

According to embodiments of the invention, the method may furthermore comprise storing the parameters representative of the boundaries of the predefined geometry or area of interest.

According to embodiments of the invention, at least partly automatically defining and calculating parameters of a predefined geometry or area of interest in which the at least one radar sensor has to measure may comprise:

scanning or beaming with the at least one radar sensor the predefined geometry or area of interest in which the at least one sensor has to measure a plurality of times in at least one of the azimuth plane and the elevation plane, within a plane of view, thereby defining a range-angle map for each scan plane, identifying at least three points forming a line in the scan plane, the line being perpendicular to a normal of a view angle of the at least one radar sensor, and determining, from the range-angle map and the identified points, the parameters of the boundaries of the predefined geometry or area of interest in which the at least one sensor has to measure.

An advantage of the method according to this embodiment is that it can be done fully automatically, and still very precise, without or with only very limited interference of a user.

According to other embodiments, at least partly automatically defining and calculating parameters of a predefined geometry or area of interest in which the at least one radar sensor has to measure may comprise:

scanning in at least one plane within the detection range of the at least one radar sensor, detecting the location of aiding elements present at the boundaries of the predefined geometry or area of interest in which the at least one radar sensor has to measure, and from the location of the aiding elements, define the boundaries of the predefined geometry or area of interest.

According to further embodiments, at least partly automatically defining and calculating parameters of a predefined geometry or area of interest in which the at least one radar sensor has to measure may comprise:

scanning in at least one plane within the detection range of the at least one radar sensor, tracking a path of at least one moving target through and/or around the predefined geometry, and from the tracked path, define the boundaries of the predefined geometry or area of interest.

The path may start at a predefined location, for example close to the at least one radar sensor, and may cover at least part of the predefined geometry or area of interest and preferably as much as possible of the predefined geometry or area of interest.

Tracking the path of at least one moving target may be performed by recording the direction of motion together with the actual spatial position of the at least one moving target with respect to the at least one radar sensor. The path may be a random path, a predefined path, a perimeter path or a combination thereof.

According to still further embodiments of the invention, at least partly automatically defining and calculating parameters of a predefined geometry or area of interest in which the at least one radar sensor has to measure may comprises:

further perform measurements by a means for assisting in the defining and calculating parameters of a predefined geometry or area of interest in which the at least one radar sensor has to measure, and from the measurement results of the means for assisting in defining and calculating parameters of a predefined geometry or area of interest in which the at least one radar sensor has to measure, determine the boundaries of the predefined geometry or area of interest in which the at least one radar sensor has to measure.

The means for assisting in the defining and calculating parameters of a predefined geometry or area of interest in which the at least one radar sensor has to measure may be means suitable for using time-of-flight measurement or triangular techniques. The means for assisting in defining and calculating parameters of a predefined geometry or area of interest in which the at least one radar sensor has to measure may, for example, be a laser, an image sensor, a PIR sensor, a LIDAR detector or the like.

According to embodiments of the invention, the method may furthermore comprise triggering the start of defining and calculating the parameters of the boundaries of the predefined geometry or area of interest of the at least one radar sensor. Triggering the start of defining and calculating the parameters of the boundaries of the predefined geometry or area of interest of the at least one radar sensor may, according to embodiments of the invention, occur automatically when the electric or electronic device module is put on. According to other embodiments of the invention, triggering the start of defining and calculating the parameters of the boundaries of the predefined geometry or area of interest of the at least one radar sensor may be performed manually by a user by, for example, pushing a button on the electric or electronic device module or starting an app on a smartphone or tablet.

BRIEF DESCRIPTION OF THE DRAWINGS

It has to be noted that same reference signs in the different figures refer to same, similar or analogous elements.

FIG. 1A and FIG. 1B schematically illustrate a radar detection pattern for respectively a wall mounted radar sensor and a ceiling mounted radar sensor according to the prior art.

FIGS. 2A to 2C schematically illustrated room coverage for a wall mounted radar sensor in a rectangular room according to the prior art.

FIG. 3A to 3C schematically illustrated room coverage for a ceiling mounted radar sensor in a rectangular room, according to the prior art.

DESCRIPTION OF ILLUSTRATIVE EMBODIMENTS

Figure 4:
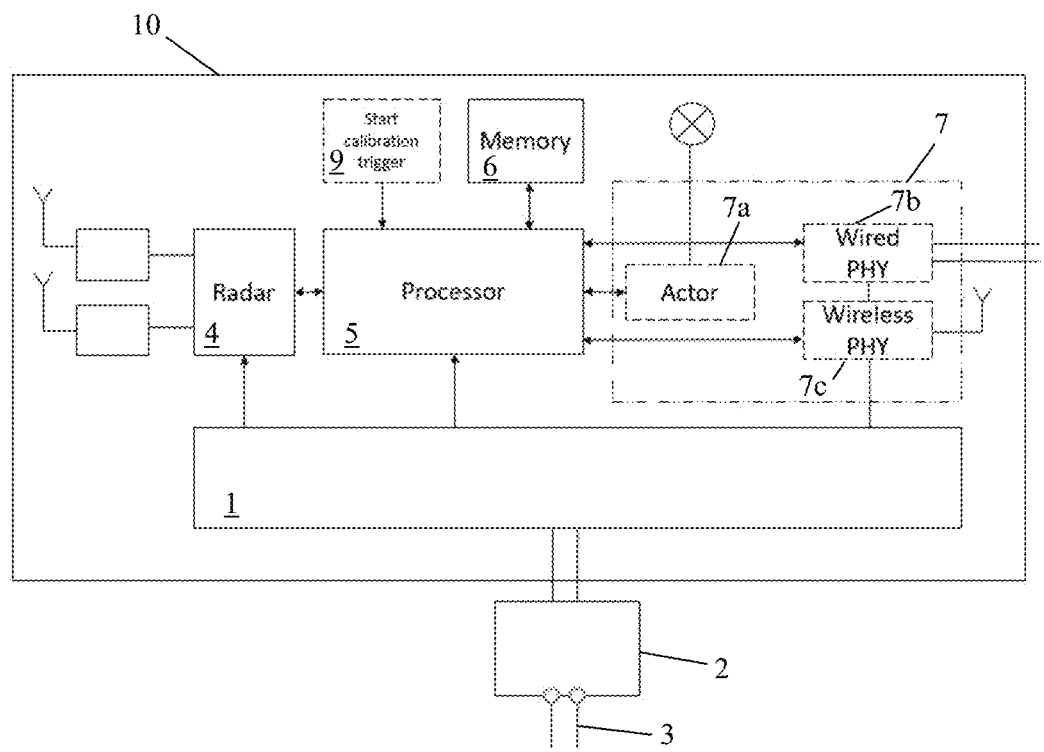
FIG. 4 schematically illustrates an electric or electronic device module, and more particular a switch device module, according to embodiments of the invention.

In the description different embodiments will be used to describe the invention. Therefore reference will be made to different drawings. It has to be understood that these drawings are intended to be non-limiting, the invention is only limited by the claims. The drawings are thus for illustrative purposes, the size of some of the elements in the drawings may be exaggerated for clarity purposes.

The term "comprising" is not to be interpreted as limiting the invention in any way. The term "comprising", used in the claims, is not intended to be restricted to what means is described thereafter; it does not exclude other elements, parts or steps.

The term "connected" as used in the claims and in the description has not to be interpreted as being restricted to direct connections, unless otherwise specified. Thus, part A being connected to part B is not limited to part A being in direct contact to part B, but also includes indirect contact between part A and part B, in other words also includes the case where intermediate parts are present in between part A and part B.

Not all embodiments of the invention comprise all features of the invention. In the following description and claims, any of the claimed embodiments can be used in any combination.

The present invention provides an electric or electronic device module, also referred to as electric or electronic installation material. The electric or electronic device module comprises an electric or electronic device, such as e.g. a light switch, a sensor, a socket, a USB device, a lighting device, a thermostat, a video door station, a display such as e.g. a touch screen provided on an internal wall of a building, a detector such as e.g. a motion detector, a presence detector, an absence detector, . . . , a speaker device, a wireless router, or the like. The electric or electronic device module further comprises means for powering the electric or electronic device module, and at least one radar sensor having a detection range. According to the invention, the electric or electronic device module furthermore comprises a processor adapted for calibrating the at least one radar sensor by at least partly automatically defining and calculating parameters of boundaries of a predefined geometry or area of interest in which the at least one radar sensor has to measure, in order to prevent the at least one radar sensor from taking into account measurements outside the predefined geometry. The predefined geometry is located within the detection range of the at least one radar sensor and is equally sized to or smaller than that detection range of the at least one radar sensor.

Throughout the description and claims, with radar sensor is meant a radar configured for generating a radar beam, or in other words, a beam of radio waves, for transmitting the radar beam using a transmit module, for scanning the radar beam in at least one of azimuth or elevation planes (preferably both azimuth and elevation), and for receiving the reflected beam at a plurality of receiving modules. Radar sensors may also be referred to as HF and microwave sensors. The range in which such radar sensor can work, or in other words the range as set during manufacturing of the radar sensor, is referred to as detection range of the radar sensor. The real working space or the area in which a user wants the radar sensor to measure, in order to prevent this radar sensor from taking into account measurements outside this range, is, throughout the description and the claims, referred to as predefined geometry or area of interest.

Further, throughout the description and claims, with at least partly automatically is meant that at least part of defining and calculating the parameters of the boundaries of the predefined geometry or area of interest in which the at least one radar sensor has to measure is done by the processor itself without or with only little or limited interference of a user. According to embodiments of the invention, such boundaries can be "real" boundaries, such as for example walls of a room, or can be "imaginary" boundaries determined by a user. With imaginary boundaries is meant that the boundaries do not coincide with physical items, but are just fictitious boundaries predefined by a user and defining an area of interest in which the radar sensor has to measure.

According to embodiments of the invention, defining and calculating parameters of the boundaries of the predefined geometry or area of interest may be done substantially fully automatically. With substantially fully automatically is meant that, according to embodiments of the invention, defining and calculating such parameters occurs fully automatically, after for example a push on a calibration button or via an app on a smart phone or tablet, without further interference of a user. A further advantage of embodiments of the invention is that for the at least one radar sensor in the electric or electronic device module, defining and calculating parameters of the boundaries of the predefined geometry or area of interest in which the at least one radar sensor has to measure can be done easy and fast, and more precise with respect currently existing radar sensors, in which setting the detection range is to be done by means of a potentiometer on the radar sensor.

Still a further advantage of embodiments of the invention is that, although the detection range of the at least one radar sensor can still be outside the predefined geometry or area of interest in which the at least one radar sensor has to measure or detect, the at least one radar sensor will know that it has not to take into account measurements or detections from outside this predefined geometry or area of interest, which significantly decreases the false measurement and thus will significantly increase the liability of the at least one radar sensor in the electric or electronic device module.

For the ease of understanding the invention, it should be made clear that, according to the present invention, a distinction is made between two characteristic ranges or areas of the at least one radar sensor. A first range or area is, according to this invention, referred to as the detection range of the at least one radar sensor. This means the detection range that the at least one radar sensor can cover, independent of calibration or other settings of the at least one radar sensor, or in other words, the detection range as set during the manufacturing of the at least one radar sensor. This detection range may be larger than, for example, a room in which the at least one radar sensor is positioned or larger than the intended area for detection for a particular application. The second range or area is the predefined geometry or area of interest of the at least one radar sensor. With this term is meant the real range or area in which the at last one radar sensor has to measure for a particular application. An important characteristic of this invention, is that this predefined geometry or area of interest can exactly be set, which is not the case with prior art radar sensors. A first advantage hereof is that this overcomes the problem of false detection by also detecting movements outside the predefined geometry or area of interest, such as e.g. a room, because, as was already mentioned above, it is known that radar waves are able to penetrate certain building materials. A further advantage is that any shape of predefined geometry or area of interest can be defined in which the at least one radar sensor needs to measure. The predefined geometry or area of interest may also be referred to as predefined volume, or predefined shape, or predefined space, or predefined detection volume, or predefined spatial volume of the radar sensor.

The present invention will hereinafter be described by means of different embodiments. It has to be understood that these embodiments are only for the ease of understanding the invention and are not intended to limit the invention in any way.

FIG. 4 schematically illustrates an electric or electronic device module 10 according to embodiments of the invention. The electric or electronic device module 10 comprises an electric or electronic device 1 such as, for example, a light switch, a sensor, a socket, a USB device, a lighting device, a thermostat, a video door station, a display such as e.g. a touch screen provided on an internal wall of a building, a detector such as e.g. a motion detector, a presence detector, an absence detector, . . . , a speaker device, a wireless router, or the like. In the example given the electric or electronic device module is a light switch device module 10. Further, the electric or electronic device module 10 comprises means 2 for powering all parts of the electric or electronic device module 10. The means 2 for powering all parts of the electric or electronic device module 10 may, according to embodiments of the invention, comprise a connection 3 to an AC or DC grid or to an energy harvesting system such as, for example, solar cells.

In the electric or electronic device module 10, at least one radar sensor 4 is provided. The at least one radar sensor 4 may be any suitable radar sensor known by a person skilled in the art and may preferably be a pulse-Doppler or Frequency Modulated Continuous Wave radar with either a MIMO (multiple input multiple output) or a SISO (single input single output) antenna topology. Variants of a MIMO radar are SIMO (single input multiple output) and MISO (multiple input single output) radars. The antennas setup may be a 1D array of antennas, a 2D array of antennas or two 1D arrays of antennas.

As clear for a person skilled in the art, the at least one radar sensor 4 may preferably be so positioned in the electric or electronic device module, in the example given the light switch device module 10, such that its radar wave beam is not obstructed by other parts of the electric or electronic device module 10. According to embodiments of the invention, the at least one radar sensor 4 may be positioned close to the front part of the device module 10 while other electric or electronic elements are positioned more to the back of the device module 10. However, this is not necessarily so, according to other embodiments, the at least one radar sensor 4 may also be positioned more in the back of the device module 10 while other electric or electronic elements of the device module 10 are positioned more to the front, as long as the radar wave beam is not obstructed by these other electric or electronic elements.

The electric or electronic device module 10 furthermore comprises a processor 5. The processor 5 is, according to embodiments of the invention, adapted for calibrating the at least one radar sensor 4 in order to prevent the at least one radar sensor 4 from taking into account measurements outside a predefined geometry or area of interest 11 within a building. According to embodiments of the invention, this calibrating is done by at least partly automatically defining and calculating parameters of boundaries of the predefined geometry or area of interest 11 in which the at least one radar sensor 4 has to measure, the predefined geometry or area of interest 11 being located within the detection range of the at least one radar sensor 4 and being equally sized to or smaller than the detection range of the at least one radar sensor 4.

With predefined geometry or area of interest is, as already mentioned above, meant a predefined volume, or predefined shape, or predefined space, or predefined detection volume, or predefined spatial volume of the radar sensor, or in other words an area of interest of the at least one radar sensor 4.

In other words, the predefined geometry or area of interest is the range or area which is of interest for a particular application and in which the at least one radar sensor has to measure or detect. The predefined geometry or area of interest may preferably be a 3D geometry, and may, for example, be rectangular, circular, square, or any other required geometry, e.g. a shaped geometry, depending on the application and where the electric or electronic device module 10 is located.

In other words, the predefined geometry or area of interest 11 in which the at least one radar sensor 4 needs to measure, or the geometry or area which the at least one radar sensor 4 needs to learn as the area in which he needs to detect or measure, needs to be defined in advance because in most cases, it is different from the real detection range of the at least one radar sensor 4.

Figure 5:
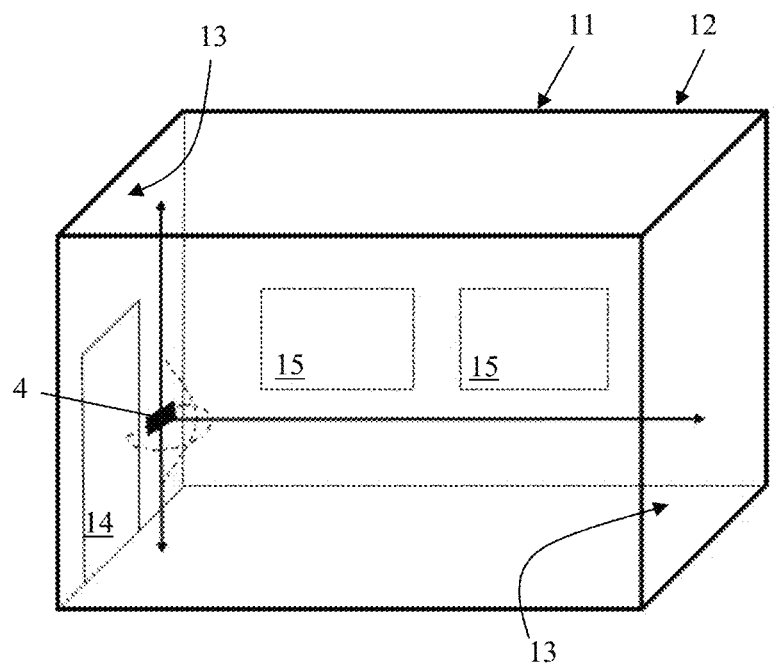
FIG. 5, FIG. 6A to 6C and FIG. 7 schematically illustrate the difference between the detection range of a radar sensor and the predefined geometry or area of interest of the radar sensor according to embodiments of the invention.
Figure 6A:
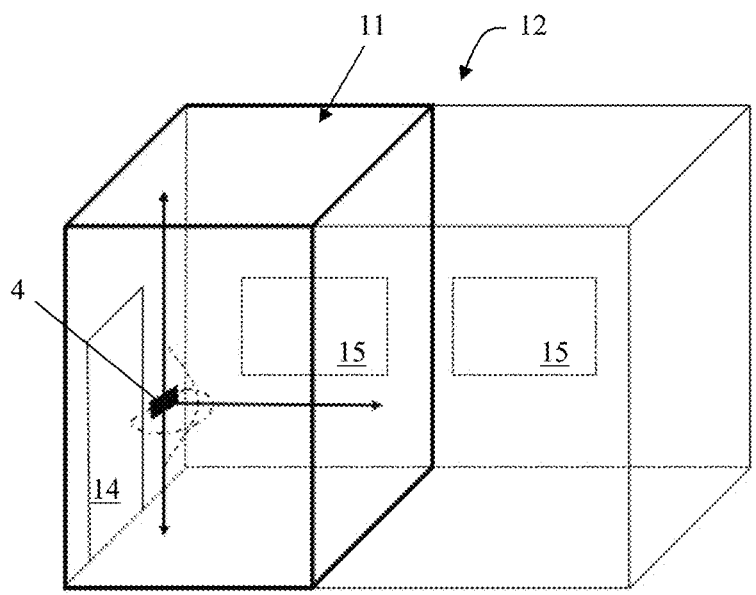
Figure 6B:
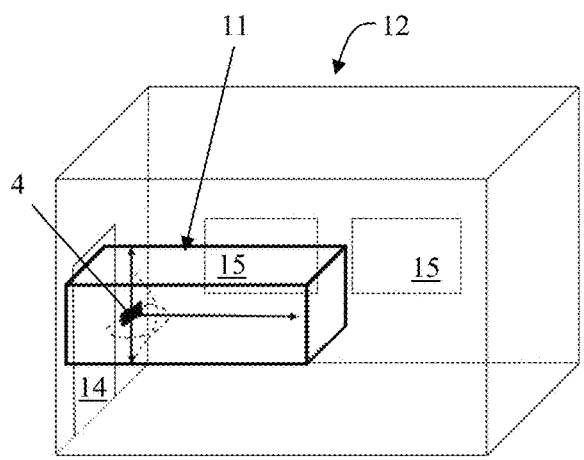
Figure 6C:
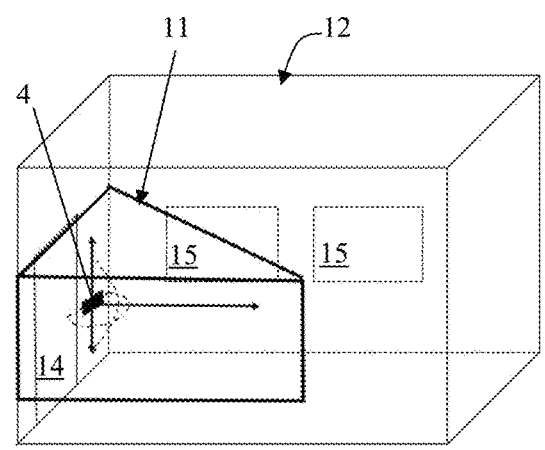

This predefined geometry or area of interest 11 may, according to embodiments of the invention, for example be equal to a room 12 in which the at least one radar sensor 4 is located, and may thus in that case be defined by the walls 13 of that room. This is illustrated in FIG. 5, which schematically represents a room 12 in a building, with a door 14 and windows 15 indicated. As can be seen from this figure, the predefined geometry or area of interest 11 of the at least one radar sensor 4 is equal in size and shape with respect to the size and shape of the room 12. However, according to other embodiments of the invention, the predefined geometry or area of interest 11 for the at least one radar sensor 4 may be different from and/or may be smaller than the room 12. This is illustrated in FIGS. 6A to 6C. From the figures it can be seen that the predefined geometry or area of interest 11 of the at least one radar sensor 4 can have any suitable shape as required for a particular application. It can also be seen that the predefined geometry or area of interest 11 can, for example, be shaped so as to only be able to detect a person coming into the room 11 through the door 14, see FIGS. 6B and 6C.

Figure 7:
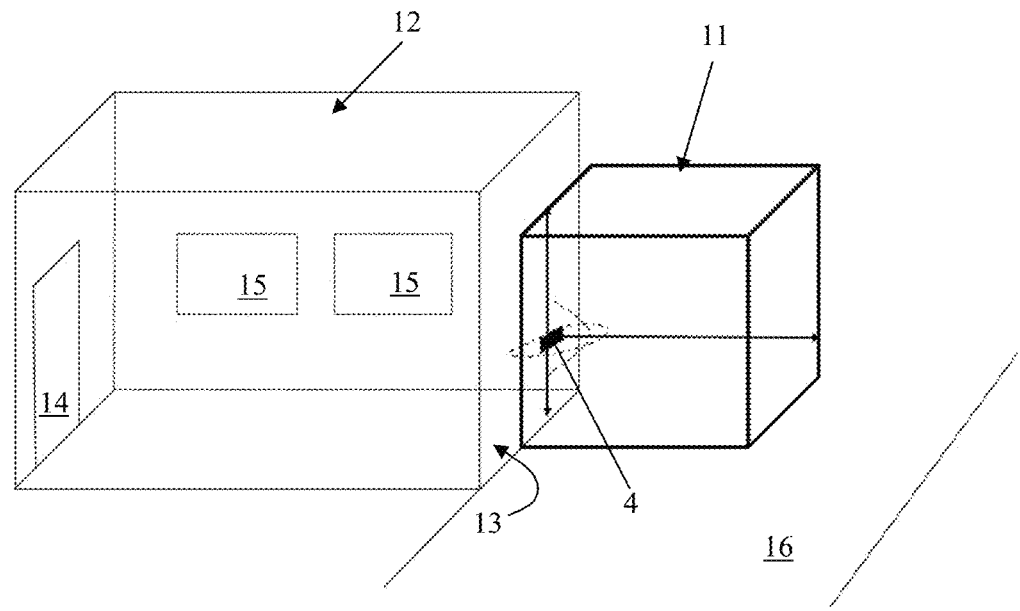

Further, the predefined geometry or area of interest 11 of the at least one radar sensor 4 may also be defined outside a building, for example in a garden 16. The electric or electronic device module 10 and thus also the at least one radar sensor 4 may then, for example, be provided at an outer wall 13 of a building. This is illustrated in FIG. 7. This may be particularly useful for, for example, when the electric or electronic device module 10 is a lighting device module for detecting when someone is coming to the door to, for example, trigger the lighting device to be activated. Or the electric or electronic device module 10 may be an alarm device module to trigger when someone is entering the garden 16, when this is not allowed or when nobody is at home.

The electric or electronic device module 10 may further also comprises means 6 for storing the parameters representative of the boundaries of the predefined geometry or area of interest 11. According to embodiments of the invention, this means 6 may be part of the electric or electronic device module 10 and may, as illustrated in FIG. 4, be a memory 6 for storing the parameters representative of the boundaries of the predefined geometry or area of interest 11. However, according to other embodiments of the invention, this means 6 for storing the parameters representative of the boundaries of the predefined geometry or area of interest 11 may also be external to the electric or electronic device module 10. According to such embodiments, the parameters representative of the boundaries of the predefined geometry or area of interest 11 may, for example, be stored at a location in the cloud, or in a remote control and communication means, such as a gateway. The memory 6 may furthermore serve for reading in and reading out these parameters.

An electric or electronic device module 10 according to embodiments of the invention can be a stand-alone device module or can be configured to be part of an automation system for residential buildings, offices, schools or hospitals. Independent on whether the electric or electronic device module 10 is a stand-alone device or is part of an automation system, according to embodiments of the invention, the electric or electronic device module 10 may furthermore comprise a communication module 7.

When the electric or electronic device module 10 is a stand-alone device, the communication module 7 may be for communicating to another electric or electronic device module 10 according to embodiments of the invention (comprising at least one radar sensor) or just to another electric or electronic device (not comprising a radar sensor). For example, in case the electric or electronic device module 10 is a light switch module, the communication means 7 may be for communicating a signal to a further electric or electronic device, in the example given a lighting device.

In case the electric or electronic device module 10 is part of a home automation system, the communication means 7 may be for controlling and/or communicating with other electric or electronic devices in the automation system.

The communication means 7 may comprise an actor 7a and a physical interface 7b, 7c. For example, the communication means 7 can have a wired physical interphase 7b to an automation system or can have a wireless connection 7c, or can have both.

Figure 8:
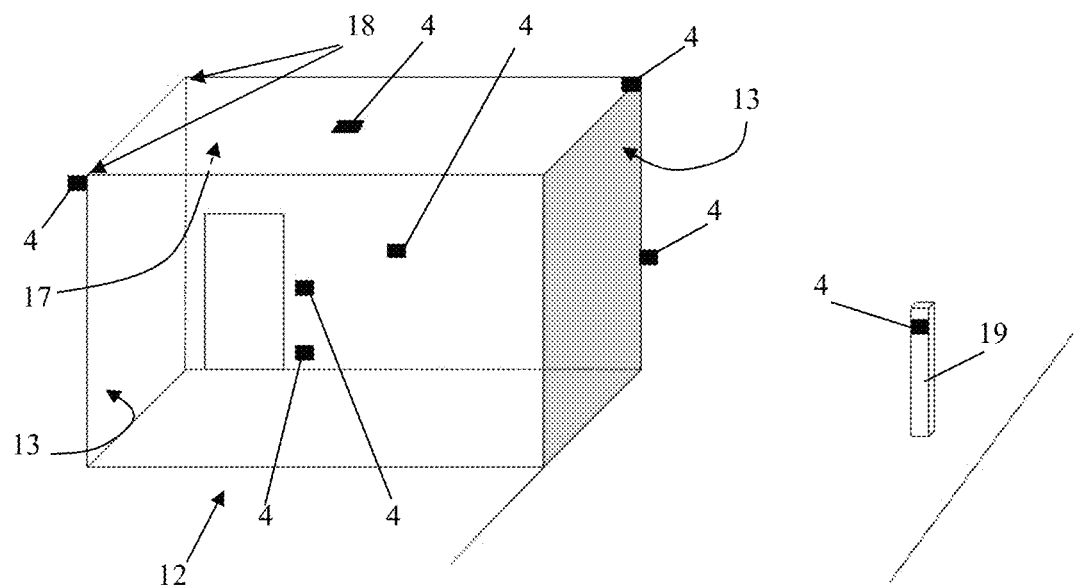
FIG. 8 illustrates some different possible locations where an electric or electronic device module can be positioned.

As already partly described above, an electric or electronic device module 10 according to embodiments of the invention may be provided on or in an internal or external wall 13 of a room 12 in a building, in or on a ceiling 17 of a room 12 in a building, in a corner 18 of a room 12 or outside a building, or on a pillar 19 that is located inside or outside a building. This is schematically illustrated in FIG. 8. With internal wall 13 of a building is meant a side of the wall 13 that is located on the inside of the building. With an external wall 13 of the building is meant a side of the wall 13 that is located at the outside of the building. According to embodiments of the invention, the electric or electronic device module 10 may be provided at any location on a ceiling 17, preferably in the middle of the ceiling 17 or in a corner 18, or at any location on a wall 13. It has to be noted that any number of electric or electronic device modules 10 comprising at least one radar sensor 4 according to embodiments of the invention may be provided in a room 12 or in an open air space, such as e.g. a garden 16, as wanted or required by a user. Any combination of electric or electronic device modules 10 according to embodiments of the invention can be combined in a room 12 or in an open air space 16. For example, one or more light switch device modules may be provided, together with one or more lighting device modules and maybe in combination with a thermostat module. It is also possible to provide a combination of prior art electric or electronic device modules without radar sensor with electric or electronic device modules 10 according to embodiments of the invention.

Figure 9A:
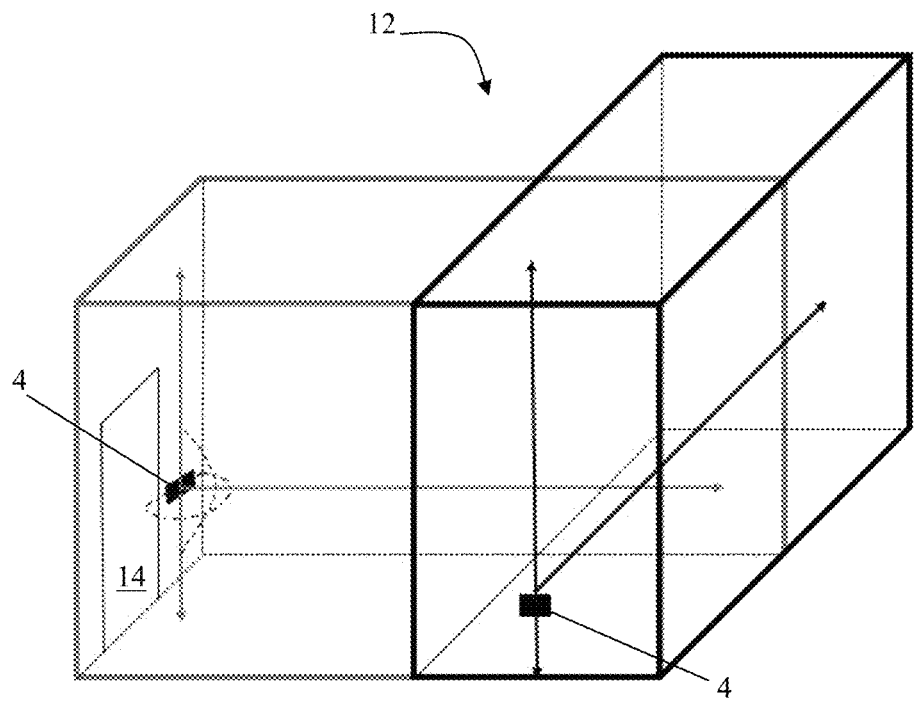
FIG. 9A and FIG. 9B illustrate possible geometries of a room and the implication on the location of electric or electronic devices according to embodiments of the invention.
Figure 9B:
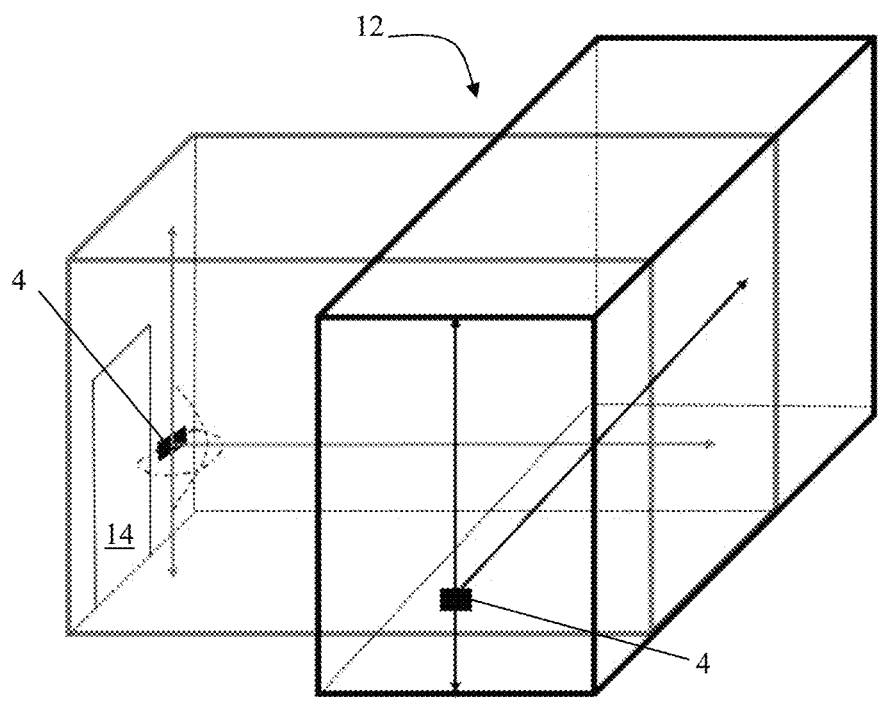

Depending on the shape and size of the predefined geometry or area of interest 11 to be covered, only one or a plurality of radar sensors 4 may be provided in one electric or electronic device module 10 or a plurality of electric or electronic device modules 10 may be provided on different locations in a room 12 or open air area 16. This is illustrated in FIGS. 9A and 9B. Exemplary shapes of rooms 12 are illustrated in these figures as they schematically illustrate an L-shaped room 12 (FIG. 9A) and a T-shaped room 12 (FIG. 9B). As can be seen from the figures, it may not be possible to cover the required predefined geometry or area of interest 11 with only one electric or electronic device module 10 according to embodiments of the invention, and thus with one or more radar sensors 4 at one location. Therefore, it might be necessary to provide electric or electronic device modules 10 with at least one radar sensor 4 at more locations.

After installing or providing the electric or electronic device module 10 at the right location inside or outside a building, the at least one radar sensor 4 in the device module 10 needs to be calibrated or, in other words, needs to learn the predefined geometry or area of interest 11 in which it has to measure.

The start of setting a predefined geometry or area of interest 11 in which the at least one sensor 4 has to measure may first be triggered. Therefore, the electric or electronic device module 10 may furthermore comprise means 9 for triggering the start of defining and calculating the parameters of the boundaries of the predefined geometry or area of interest 11 of the at least one radar sensor 4. The means 9 for triggering the start of defining and calculating the parameters of the boundaries of the predefined geometry or area of interest 11 of the at least one radar sensor 4 may, according to embodiments of the invention, be means to automatically start defining and calculating the parameters of the boundaries of the predefined geometry or area of interest 11 of the at least one radar sensor 4 at the moment when the electric or electronic device module 10 is turned on. According to other embodiments, the means 9 for triggering the start of defining and calculating the parameters of the boundaries of the predefined geometry or area of interest 11 of the at least one radar sensor 4 may be an app on a smart phone or a tablet or a button on the electric or electronic device module 10.

In the latter case, and in the case of automatically triggering the start of defining and calculating the parameters of the boundaries, means 9 may be part of the electric or electronic device module 10, as is the case in the example illustrated in FIG. 4.

Setting a predefined geometry or area of interest 11 in which the at least one sensor 4 has to measure can, according to the present invention, be done in different ways.

According to a first embodiment, the at least one radar sensor 4 may be adapted for setting up a range-angle map of the predefined geometry or area of interest 11 by scanning in at least one of the azimuth plane and the elevation plane, and the processor 4 may be adapted to, from het range-angle map, automatically determine the parameters of the predefined geometry or area of interest 11 in which the at least one radar sensor 4 has to measure. Preferably, this method makes use of the walls 13 and corners 18 of a room 12 in a building and is thus also particularly useful for predefined geometries 11 having a size equal to the size of the room 12. The method may be performed for two opposite angles. These angles may have any suitable size and do not necessarily have to be right angles.

According to such embodiments, at least partly automatically defining and calculating parameters of a predefined geometry or area of interest 11 in which the at least one radar sensor 4 has to measure comprises, in a first step, scanning or beaming with the at least one radar sensor 4 the predefined geometry or area of interest 11 a plurality of times in at least one of the azimuth plane and the elevation plane, within a plane of view, thereby defining a range-angle map after each scan. It has to be noted that the at least one radar sensor 4 preferably has a clear line of sight in order to be able to detect the wall 4 and corners 18 of the room 11.

In case the electric or electronic device 10 is located on one wall 13 of the room 12, another opposite wall 13 is detected by collocating detections made by the radar sensor 4 on that opposite wall 4. This can be done by scanning in the azimuth plane. In order to detect corners 18, it may be preferred but not necessary that the radar sensor 4 scans in both azimuth and elevation planes. A range-angle map is obtained after each scan. The beam-width of the antenna radiation pattern of the radar sensor 4 is inversely proportional to its aperture. In the case of MIMO radar sensors having many antenna elements, a sharp directional beam, also popularly referred to as pencil-beam, can be generated. If the antenna array is suitably placed, the sharp beam can be steered in both the azimuth and elevation planes.

Figure 10:
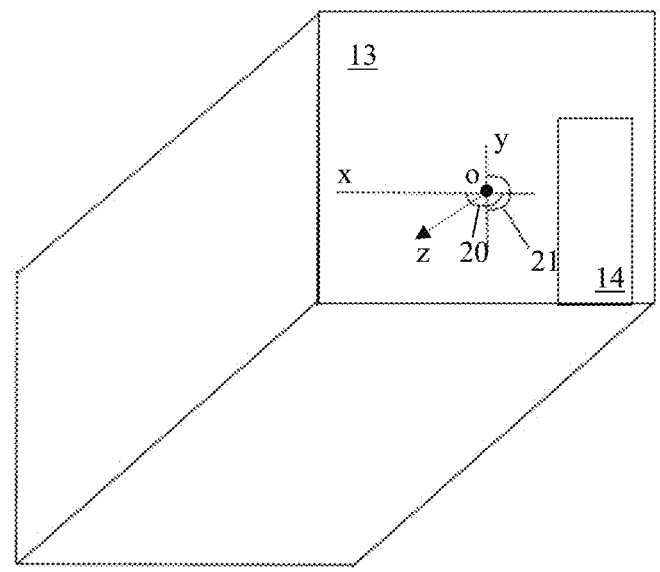
FIG. 10, FIG. 11 and FIG. 12 schematically illustrate methods for setting a predefined geometry or area of interest for the at least one radar sensor that is part of an electric or electronic device module according to different embodiments of the invention.
Figure 11:
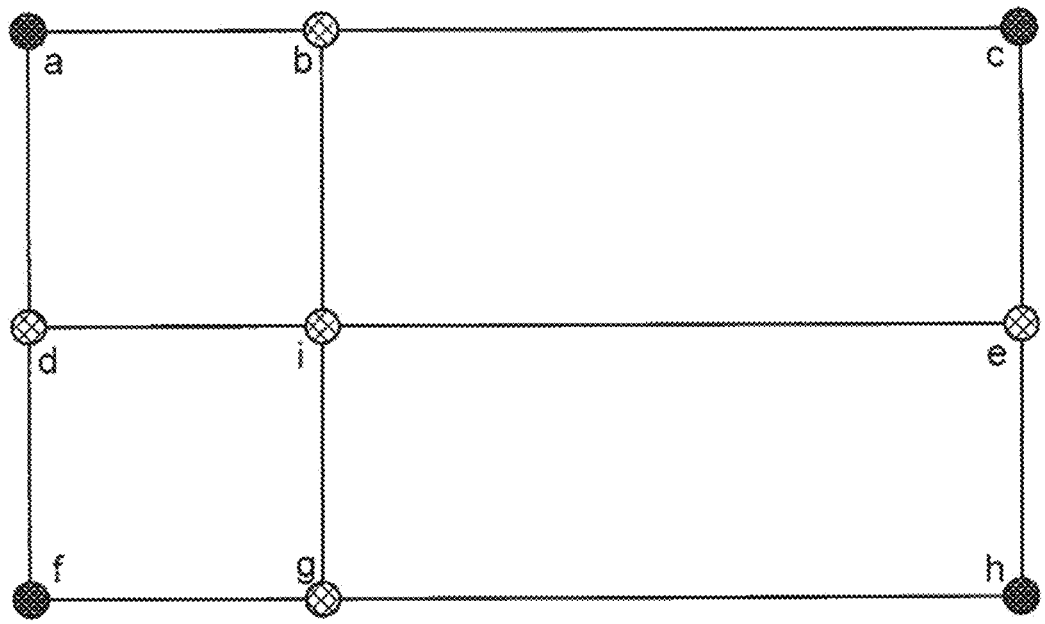

For example, when an electric or electronic device module 10 comprising at least one radar sensor 4 according to embodiments of the invention is installed in a rectangular room at "o" as shown in FIG. 10, the azimuth plane is the plane formed by lines (xo) and (zo) and elevation plane is formed by lines (yo) and (zo). Azimuth angles are spanned by curve 20 and elevation angles are spanned by curve 21. When no part of the wall 13 is occluded by other objects, it is possible to detect points lying on the lines (adf), (big) and (ceh) with the range-angle maps of azimuth scan and points corresponding to lines (abc), (die) and (fgh) with the range-angle maps of elevation scan, as shown in FIG. 11 where lines corresponds to points detected along azimuth and elevation with vertical lines indicating azimuth scans and horizontal lines indicating elevation scans. Although nine points connected by respective lines are shown in FIG. 11, according to this method, it may only be necessary to identify three of these points in a straight line to derive the position of the furthest wall 13, for example, points on lines (abc), (die) and (fgh) in the elevation plane and points on lines (adf), (big) and (ceh) in the azimuth plane. The line formed by these three points lies in a scan plane and is perpendicular to a normal of a view angle of the at least one radar sensor 4.

In an empty room 12 with ideal conditions, all nine points as shown in FIG. 11 are detected. However, in practice, there can be other detections from objects that are present in the room 12, such as for example a table, chairs, etc. It is assumed that objects or items on the ground or floor of the room 12 are distributed randomly and are seldom in one straight line and almost never on a single plane. Therefore, in order to identify the real perimeter, a least-square fit is performed with all detected points in both elevation and azimuth planes. The least-square fit can also be performed with the points detected only from azimuth or elevation scans. A straight line or a plane perpendicular to the normal angle of the radar sensor 4 is determined at different distances from the radar sensor 4 to find the best fit. The distance at which the best fit is found is determined to be location of a detected wall 13.

Once the opposite wall 13 is identified, it is assumed that the enclosure is rectangular. From the detected points located on the identified wall 13, the extent of the wall (length from corner-corner) and an estimate of the room dimension may be deduced by simple trigonometric identities.

Hence, from the range-angle maps and the identified points, the parameters of the boundaries of the predefined geometry or area of interest 11 in which the at least one sensor 4 has to measure can be defined.

Although in the above description it was assumed that the room 12 was rectangular, in real life, different room shapes will need to be considered when determining the position of the opposite wall 13. For example, in case of an L-shaped room as shown in FIG. 9A, a single radar sensor 4 cannot easily cover both parts of the L-shape. Therefore, in such case, two independent radar sensors 4 and thus two electric or electronic device modules 10 according to embodiments of the invention may need to be provided, one in each respective arm of the L-shaped room 12 as is also shown in FIG. 9A. As shown, due to the positioning of the radar sensors 4, there is a region of overlap. Each radar sensor 4 captures the corners 18 in the wall 13 opposite to the related electric or electronic device module 10 and thus related radar sensor 4, and determines a rectangular space. It will clear to a person skilled in the art that the location of the electric or electronic device module 10, and thus of the at least one radar sensor 4, needs to be carefully considered in rooms 12 with non-rectangular shape, and where more than one radar sensor 4, and thus more than one electric or electronic device 10, at different locations is required to cover the room 12 defined by the walls 13. For each radar sensor 4, the determination of the opposite wall 13 is performed as discussed above.

An advantage of the present embodiment is that it can be done fully automatically, and still very precise, without or with very limited interference of a user. It only requires triggering of the start of defining and calculating parameters of boundaries of a predefined geometry or area of interest 11 in which the at least one radar sensor 4 has to measure. As already described above, this triggering can occur automatically when the electric or electronic device module 10 is turned on or powered or can be performed manually by a user by, for example, pushing a button on the electric or electronic device module 10 or starting an app on a smartphone or tablet.

According to a further embodiment, the at least one radar sensor 4 may be adapted for detecting at least one aiding element such as e.g. (external) attributes or (external) reflectors for reflecting the radar signal, present at the boundaries of the predefined geometry or area of interest 11 in which the at least one radar sensor 4 has to measure. Therefore, the radar sensor 4 may have to scan in at least one plane within its detection range. According to this embodiment, the processor 5 may then be adapted to, from the location of the at least one aiding element, automatically determine the parameters of the boundaries of the predefined geometry or area of interest 11 in which the at least one radar sensor 4 has to measure. According to embodiments of the present invention, only one aiding element may be used. This aiding element then needs to be moved along the boundaries of the predefined geometry or area of interest 11. However, according to further embodiments, a plurality of aiding elements may be placed along the boundaries of the predefined geometry or area of interest 11.

According to such embodiments, at least partly automatically defining and calculating parameters of a predefined geometry or area of interest 11 may comprise detecting the location of aiding elements present at the boundaries of the predefined geometry or area of interest 11 in which the at least one radar sensor 4 has to measure, and from the location of the aiding elements, define the boundaries of the predefined geometry or area of interest 11 in which the at least one radar sensor 4 has to measure.

In this case, defining and calculating parameters of a predefined geometry or area of interest 11 may be done semi-automatically or partly automatically, because interference of a user may be required for positioning the aiding elements. Nevertheless, once the aiding elements are placed, defining and calculating parameters of the predefined geometry or area of interest 11 may be done fully automatically. Examples of such aiding elements can, for example, be metal plates, other radar sensors, a person, For example, the aiding element may a panel made from any known material that is opaque or partially opaque for radar sensor signals, or in other words, that has an observable reflection at normal incidence of the radar signal, such as e.g. a metal plate, an OSB plate, a wood panel, an MDF panel, a glass panel or the like.

Figure 12:
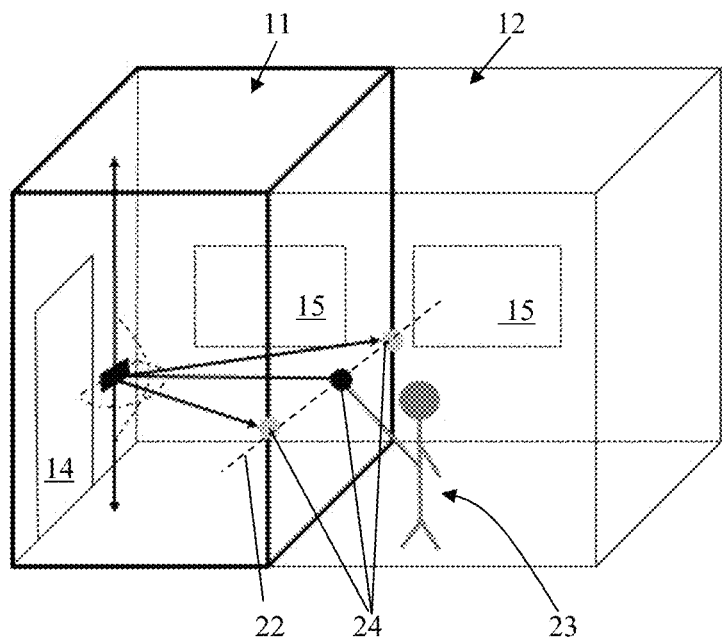

This embodiment is schematically illustrated in FIG. 12. For example, the predefined geometry or area of interest 11 is required to be half of the space of the room 12. Aiding elements, such as e.g. metal plates, can be provided on a dividing line 22. This can be done in different ways. For example, and as mentioned above, different aiding elements can be placed along the line 22 or a user 23 can walk along the line 22 with one aiding element, e.g. metal plate. The aiding elements, e.g. metal plate(s), can also be provided at reference points 24. The reference points 24 will then be visible in the range-angle map and in that way the processor 5 can calculate the predefined geometry or area of interest 11 that is required. In principle, the presence of three reference points 24 may be enough for the processor 5 to be able to calculate the predefined geometry or area of interest 11.

With respect to prior art device modules, an electric or electronic device module 10 according to such embodiments of the invention still has the advantage of being faster and easier for a user. Further, because of using the aiding elements, any shape of predefined geometry or area of interest 11 can be determined in which the at least one radar sensor 4 has to measure. This method can be performed solely or can be combined with any of the other methods as described in this invention. When using a combination of more than one method, the boundaries of the predefined geometry or area of interest 11 in which the at least one radar sensor 4 has to measure will be determined more precisely.

According to still a further embodiment, the at least one radar sensor 4 may be adapted for tracking a path of at least one moving target e.g. of a person walking around in the room 12 or in an open air space 16, in and/or around the predefined geometry or area of interest 11 in which the at least one radar sensor 4 has to measure. Hence, also according to this embodiment, the radar sensor 4 will first have to scan in at least one plane within its detection range. The processor 5 may be adapted to, from the tracked path, automatically determine the boundaries of the predefined geometry or area of interest 11.

According to such embodiments, at least partly automatically defining and calculating parameters of a predefined geometry or area of interest 11 comprises tracking a path of at least one moving target through and/or around the predefined geometry within the field of view of the radar sensor 4 using heat mapping. The heat mapping process comprises two parts. After the electric or electronic device module 10, and thus the radar sensor 4, has been installed in the room 12 or in an open air space 16, in a supervised setup, a moving target is guided within the room 12 or open air space 16 in order to validate all spatial points within the room 12 or open air space 16. Here, the at least one target is tracked by the radar sensor 4 and the tracking history is used to infer the spatial coordinates belonging to the room 12 or open air space 16. The heat mapping for defining and calculating parameters of a predefined geometry or area of interest 11 may then be initiated by a trigger to start defining and calculating parameters of a predefined geometry or area of interest 11, by for example pushing a button on the electric or electronic device module 10 or by starting an app on a smart phone or tablet, or is initiated automatically once the electric or electronic device 10 is put on. During this phase, a designated target moves in a predetermined path. The path may, for example, start at a predefined location, for example close to the at least one radar sensor 4 and thus to the electric or electronic device module 10, and may cover at least part, and preferably as much as possible, of the predefined geometry or area of interest 11. Tracking the path of the moving target(s) may, for example, be performed by recording the direction of motion together with the actual spatial position of the moving target(s) with respect to the at least one radar sensor 4. The path may be a random path, a predefined path, a perimeter path or a combination thereof. From the tracked locations along the path, using a mathematical morphology based processing operation, such as, dilation, the boundaries of the predefined geometry or area of interest 11 can be estimated.

Also according to this embodiment, defining and calculating parameters of the boundaries of the predefined geometry or area of interest 11 is done semi-automatically or partly automatically, as also here interference of a user may be required. This method can be performed solely or can be combined with any of the other methods as described. When using a combination of more than one method, the boundaries of the predefined geometry or area of interest 11 in which the at least one radar sensor 4 has to measure will be determined more precisely.

In still a further embodiment, the electric or electronic device module 10 may furthermore comprise means for assisting in determining and calculating the boundaries of the predefined geometry or area of interest 11 in which the at least one radar sensor 4 has to measure and the processor 5 may be adapted to, from the measurement results of the assisting means, automatically determine the boundaries of the predefined geometry or area of interest 11.

According to such embodiments, at least partly automatically defining and calculating parameters of a predefined geometry or area of interest 11 comprises further performing measurements by a means for assisting in the defining and calculating parameters of a predefined geometry or area of interest 11 in which the at least one radar sensor 4 has to measure, and from the measurement results of the means for assisting in defining and calculating parameters of a predefined geometry or area of interest 11 in which the at least one radar sensor 4 has to measure, determine the boundaries of the predefined geometry or area of interest 11 in which the at least one radar sensor 4 has to measure.

The means for assisting in the defining and calculating parameters of a predefined geometry or area of interest 11 in which the at least one radar sensor 4 has to measure may be means suitable for using time-of-flight measurement or triangular techniques. The means for assisting in defining and calculating parameters of a predefined geometry or area of interest 11 in which the at least one radar sensor 4 has to measure may, for example, be a laser, an image sensor, a PIR sensor, a LIDAR detector or the like. For example, a TOF laser allows to measure distance. The IR light from the laser is sent through a transmitter and a receiver then receives a light beam reflected by an object, e.g. the opposite wall 13 or an aiding element. From the propagation delay between the transmitted signal and the received signal, the distance to the object can be determined. Another example is the use of an image sensor. In that case, the image sensor could, when the at least one radar sensor detects movement, indicate whether or not the movement is in the room or in the predefined geometry or area of interest 11 when, for example, via the image sensor no person is visible. Another example are PIR sensors. As the PIR signal does not penetrate building materials, this PIR sensor can be used to detect the walls of a room. If the radar sensor detected movement, with help of the PIR sensor it can be determined whether or not the movement comes from within the room or not.

According to this embodiment, defining and calculating the parameters of the boundaries of the predefined geometry or area of interest 11 of the at least one radar sensor 4 may, dependent on the technique used, be fully or partly automatic. This method can be performed solely or can be combined with any of the other methods as described. When using a combination of more than one method, the boundaries of the predefined geometry or area of interest 11 in which the at least one radar sensor 4 has to measure will be determined more precisely.

In the above described examples, it was mentioned that combining methods can lead to a more precise determination of the boundaries of a predefined geometry or area 11 in which the at least one radar sensor 4 has to measure. However, it has to be understood that all of the above described methods can also be used as stand-alone methods. This means that each of the above methods can be used alone to provide a good calibration of the at least one radar sensor 4 in an electric or electronic device module 10 according to embodiments of the invention.

Whatever happens after the start of the calibration is triggered, e.g. by pushing a button on the electric or electronic device module 10, depends on how the algorithm within the electric or electronic device module 10 is programmed. This algorithm can be programmed to only base the calibration on full automatic scanning in at least one of the azimuth plane or the elevation plane and from this scanning determining the boundaries of the predefined geometry or area of interest 11 in a way as was described above. However, according to other embodiments of the invention, the algorithm may be programmed such that calibration is semi-automatic and is based on the use of aiding elements or a tracked path for determining the boundaries of the predefined geometry or area of interest 11 as described above. According to still further embodiments, the algorithm may be programmed so as to combine fully automatic calibration by scanning in the azimuth and/or elevation plane so as to define the boundaries of the predefined geometry or area of interest 11 with refining the determined boundaries of the predefined geometry or area of interest 11 by means of a further, semi-automatic calibration with the use of aiding elements or a tracked path, again as already described above.

According to embodiments, once the predefined geometry or area of interest 11 of the at least one radar sensor 4 in the electric or electronic device module 10 is set, according to the methods as described above in the different embodiments, and stored, the step of defining and calculating parameters of a predefined geometry or area of interest 11 may be repeated so as to refine the definition of the boundaries. This is also referred to as self-learning of the radar sensor 4. In that way, false detection by the at least one radar sensor 4 can still further be reduced.

Figure 13:
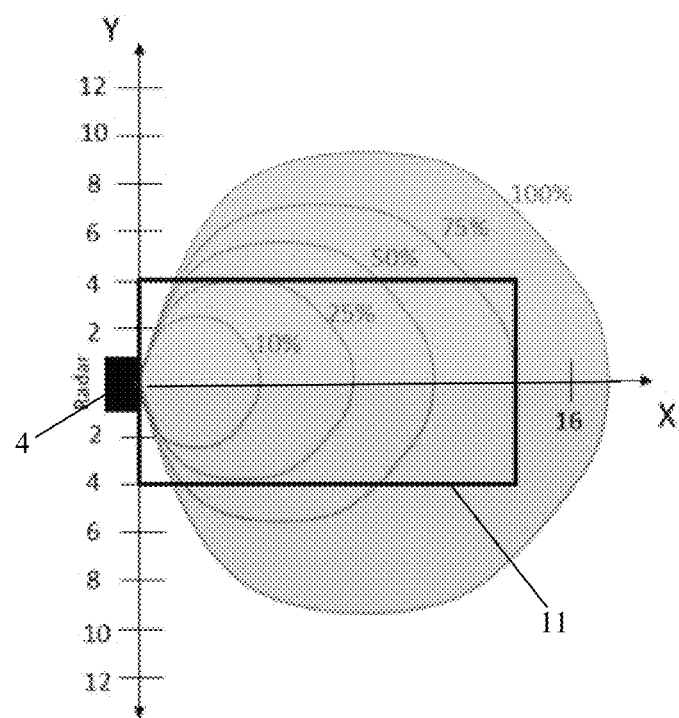
FIG. 13 and FIG. 14 schematically illustrate the detection range of a radar sensor and the predefined geometry or area of interest for a radar sensor in an electric or electronic device module according to embodiments of the invention.
Figure 14:
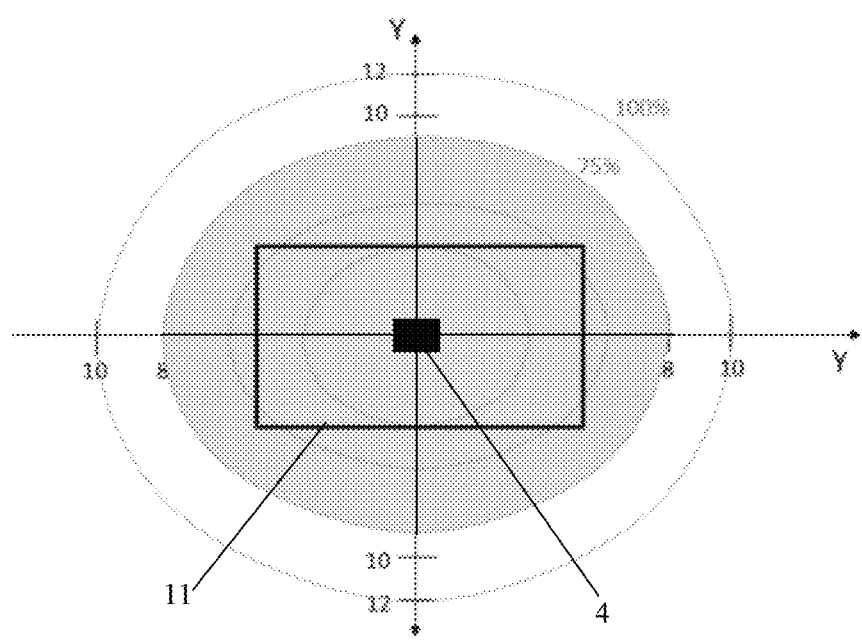

As already mentioned above, an advantage of embodiments of the invention is that, although the detection range of the at least one radar sensor 4 can still be outside the predefined geometry or area of interest 11 in which the at least one radar sensor 4 has to measure or detect, the at least one radar sensor 4 will know that it has not to take into account measurements or detections from outside this predefined geometry or area of interest 11, which significantly decreases the false measurement and thus will significantly increase the liability of the at least one radar sensor 4 in the electric or electronic device module 10. This is illustrated in FIGS. 13 and 14 for respectively a wall mounted radar sensor 4 and a ceiling mounted radar sensor 4. The difference with prior art radar sensors is also clear when comparing FIGS. 13 and 14 with FIGS. 2B, 2C, 3B and 3C. According the invention, it is not really the detection range of the radar sensor 4 that is changed or adapted, it is a predefined geometry or area of interest 11 that is defined in which the at least one radar sensor 4 has to measure. The predefined geometry or area of interest 11 is located within the detection range of the at least one radar sensor 4 and may be equally sized or smaller than the detection range of the at least one radar sensor 4. In that way, it is made possible to be able to cover a complete required predefined geometry or area of interest 11, independent on the shape of the room or area in which the at least one electric or electronic device module 10 according to embodiments of the invention is located and independent on the detection range of the radar sensor 4 used. This significantly reduces the chance for false detections and thus provides very reliable results.

The invention claimed is:

1. An electronic device module comprising:
   an electronic device,
   a powering system for powering the electronic device module, and
   at least one radar sensor having a detection range, wherein the at least one radar sensor is adapted for setting up a range-angle map of an area of interest by scanning a plurality of times in at least one of an azimuth plane and an elevation plane, within a plane of view, defining a range-angle map for each scan plane, and
   wherein the electronic device furthermore comprises a processor, wherein the processor is adapted for:
      identifying at least three points forming a line in the scan plane, the line being perpendicular to a normal of a view angle of the at least one radar sensor, and to automatically determine, from the range-angle map and the identified points, parameters of boundaries of the area of interest in which the at least one radar sensor has to measure, in order to filter measurements outside the area of interest from being taken into account;
   wherein the area of interest is located within the detection range of the at least one radar sensor and is equally sized to or smaller than the detection range of the at least one radar sensor.

2. The electronic device module according to claim 1, further comprising a storage device for storing the parameters of the boundaries of the area of interest.

3. The electronic device module according to claim 1, wherein the at least one radar sensor is adapted for detecting aiding elements present at the boundaries of the area of interest in which the at least one radar sensor has to measure, and
   wherein the processor is adapted to automatically determine the parameters of the boundaries of the area of interest in which the at least one radar sensor has to measure from the location of the aiding elements.

4. The electronic device module according to claim 1, wherein the at least one radar sensor is adapted for tracking a path of at least one moving target in and/or around the area of interest in which the at least one radar sensor has to measure and wherein the processor is adapted to automatically determine the boundaries of the area of interest from the tracked path.

5. The electronic device module according to claim 1, wherein the processor is adapted for regularly repeating said determining the parameters of the boundaries of the area of interest of the at least one radar sensor for refining the determination of the boundaries of the area of interest in which the at least one sensor has to measure.

6. The electronic device module according to claim 1, furthermore comprising means for triggering a start of said determining the parameters of the boundaries of the area of interest of the at least one radar sensor.

7. The electronic device module according to claim 1, wherein the electronic device module is adapted for being provided on or in an internal or external wall of a building or adapted for being provided in or on a ceiling of a building or adapted for being provided on a pillar that is located inside or outside a building or adapted for being provided in a corner of a building.

8. The electronic device module according to claim 1, further comprising a communication module for controlling a stand-alone electric or electronic device and/or for controlling and/or communicating with other electric or electronic device modules in an automation system.

9. A method for calibrating at least one radar sensor in an electronic device module according to claim 1 in order to filter measurements outside the area of interest from being taken into account,
wherein calibrating the at least one radar sensor comprises setting the area of interest in which the at least one radar sensor has to measure, the method comprising:
scanning with the at least one radar sensor the area of interest in which the at least one radar sensor has to measure a plurality of times in at least one of the azimuth plane and the elevation plane, within a plane of view, defining a range-angle map for each scan plane,
identifying, by means of the processor, at least three points forming a line in the scan plane, the line being perpendicular to a normal view of a view angle of the at least one radar sensor, and
determining, by means of the processor, from the range-angle map and the identified points, the parameters of the boundaries of the area of interest in which the at least one radar sensor has to measure,
the area of interest being located within the detection range of the at least one radar sensor and being equally sized to or smaller than the detection range of the at least one radar sensor.

10. The method according to claim 9, furthermore comprising storing the parameters representative of the boundaries of the area of interest.

11. The method according to claim 9, wherein said determining the parameters of the boundaries of the area of interest in which the at least one radar sensor has to measure comprises:
scanning in at least one plane within the detection range of the at least one radar sensor,
detecting the location of one or more aiding elements present at the boundaries of the area of interest in which the at least one radar sensor has to measure, and
from the location of the aiding elements, defining the boundaries of the area of interest.

12. The method according to claim 9, wherein said determining the parameters of the boundaries of the area of interest in which the at least one radar sensor has to measure comprises:
scanning in at least one plane within the detection range of the at least one radar sensor,
tracking a path of the at least one moving target through and/or around the area of interest, and
from the tracked path, defining the boundaries of the area of interest.

13. The method according to claim 12, wherein tracking the path of at least one moving target is performed by recording a direction of motion together with an actual spatial position of the at least one moving target with respect to the at least one radar sensor.

14. The method according to claim 9, furthermore comprising triggering a start of said determining the parameters of the boundaries of the area of interest of the at least one radar sensor.

15. The method according to claim 14, wherein triggering the start of said determining the parameters of the boundaries of the area of interest of the at least one radar sensor occurs automatically when the electronic device module is switched on.

16. The method according to claim 14, wherein triggering the start of said determining the parameters of the boundaries of the area of interest of the at least one radar sensor is performed manually by a user.

\* \* \* \* \*